(12) United States Patent
Lake et al.

(10) Patent No.: US 11,195,343 B2
(45) Date of Patent: Dec. 7, 2021

(54) MAINTENANCE SYSTEMS ENHANCEMENT

(71) Applicant: THE BOEING COMPANY, Chicago, IL (US)

(72) Inventors: Peter J. Lake, Auburn, WA (US); Jay K. McCullough, Belleville, IL (US); Steven D. Chapman, Chesterfield, MO (US); Lawrence C. Wadle, II, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 288 days.

(21) Appl. No.: 16/426,907

(22) Filed: May 30, 2019

(65) Prior Publication Data

US 2020/0380794 A1 Dec. 3, 2020

(51) Int. Cl.
*G07C 5/00* (2006.01)
*G05B 23/02* (2006.01)
*G07C 5/08* (2006.01)
*B64D 45/00* (2006.01)

(52) U.S. Cl.
CPC ......... *G07C 5/006* (2013.01); *G05B 23/0281* (2013.01); *G07C 5/0816* (2013.01); *B64D 45/00* (2013.01); *B64D 2045/0085* (2013.01)

(58) Field of Classification Search
CPC .. G07C 5/006; G07C 5/0816; G05B 23/0281; B64D 45/00; B64D 2045/0085
USPC ........................................................ 701/29.1
See application file for complete search history.

(56) References Cited

U.S. PATENT DOCUMENTS

| | | | |
|---|---|---|---|
| 6,622,264 B1* | 9/2003 | Bliley | G06F 11/2257 714/26 |
| 8,620,936 B2 | 12/2013 | Lake et al. | |
| 8,825,276 B2 | 9/2014 | Lake et al. | |
| 10,665,040 B2* | 5/2020 | Colvin | G06F 3/061 |
| 10,943,283 B2* | 3/2021 | Mattern | G07C 5/0816 |
| 10,997,225 B2 | 5/2021 | Santoso et al. | |
| 2009/0254240 A1* | 10/2009 | Olsen, III | G06Q 10/06 701/29.5 |
| 2012/0011403 A1* | 1/2012 | Bock | G06F 11/263 714/30 |
| 2017/0221015 A1 | 8/2017 | June et al. | |

* cited by examiner

*Primary Examiner* — Gertrude Arthur Jeanglaude
(74) *Attorney, Agent, or Firm* — Patterson + Sheridan, LLP

(57) ABSTRACT

Aspects of the present disclosure provide a method and apparatus for maintenance recommendations. Embodiments include receiving data related to a plurality of fault codes. Embodiments include determining, for each respective fault code of the plurality of fault codes, a unique subset of parameters for the respective fault code based on frequencies of the parameters within the plurality of fault codes in the data. Embodiments include receiving a plurality of fault records and a plurality of maintenance records. Embodiments include, for each respective maintenance record of the plurality of maintenance record, identifying one or more candidate fault records of the plurality of fault records and correlating a subset of the one or more candidate fault records with the respective maintenance record based on the unique subset of the parameters for the respective fault code corresponding to each respective candidate fault record of the one or more candidate fault records.

20 Claims, 8 Drawing Sheets

| DATE | DEFECT TEXT | MAINTENANCE ACTION |
|---|---|---|
| 7-AUG-2018 | ONE LEFT NAV LIGHT INOP POSITION LIGHT LED MODULES ALL OPERATIONS | CLEARING DMA LOG PAGE# 0518559 PERFORMED OPS CHECK PER AMM-33-43-11. OPS CHECK NORMAL. CL# 50877 |
| 7-AUG-2018 | OVERHEAD MAIN LIGHT ILLUMINATED AFTER LANDING NO 1 ENGINE OIL DEBRIS MONITORING SYSTEM DMS SENSOR | ALL FIM TASK 679-21-00-810-801 FAULT MESSAGE 79-41192 IS NOT ACTIVE AT THIS TIME SEE DEFECT NO 7574 FOR ADDITIONAL WORK ACCOMPLISHED CL 51148 |

MAINTENANCE SYSTEMS ENHANCEMENT

INTRODUCTION

Aspects of the present disclosure relate to maintenance systems and methods and, more particularly, to analyzing data related to maintenance of vehicles.

Certain vehicles include monitoring technologies that detect conditions of various components. In some cases, maintenance actions are performed on vehicles in response to conditions detected through monitoring technologies. In some cases, it is useful to match records of maintenance actions with data detected during monitoring in order to identify correlations. These correlations can useful, for example, in determining future maintenance actions to perform based on monitoring data.

As such, there is a need in the art for improved techniques of matching maintenance records with monitoring data.

BRIEF SUMMARY

Certain embodiments provide a computer-implemented method, comprising: receiving data related to a plurality of fault codes, wherein the data comprises parameters for each given fault code of the plurality of fault codes; determining, for each respective fault code of the plurality of fault codes, a unique subset of the parameters for the respective fault code based on frequencies of the parameters within the plurality of fault codes; receiving a plurality of fault records; receiving a plurality of maintenance records; for each respective maintenance record of the plurality of maintenance records: identifying one or more candidate fault records of the plurality of fault records for correlation with the respective maintenance record based on a time window; and correlating a subset of the one or more candidate fault records with the respective maintenance record based on the unique subset of the parameters for the respective fault code corresponding to each respective candidate fault record of the one or more candidate fault records; and providing output to a client system based on the correlating.

In some embodiments, providing the output to the client system based on the correlating comprises: receiving a particular fault record from the client system; determining, based on the correlating, that the particular fault record is correlated with a particular maintenance record of the plurality of maintenance records; and providing the particular maintenance record to the client system.

In certain embodiments, determining, for each respective fault code of the plurality of fault codes, the unique subset of the parameters for the respective fault code comprises determining a uniqueness score for each respective term within each respective parameter of the unique subset of parameters for the respective fault code.

In additional embodiments, determining the uniqueness score for each respective term within each respective parameter of the unique subset of parameters for the respective fault code comprises determining a frequency of the respective term within the parameters for the respective fault code and a frequency of the respective term within the parameters for each fault code of the plurality of fault codes.

In certain embodiments, correlating the subset of the one or more candidate fault records with the respective maintenance record comprises determining, for each respective candidate fault record of the one or more candidate fault records, a correlation score in relation to the respective maintenance record based on the uniqueness score for each given parameter of the unique subset of parameters of the given fault code corresponding to the respective candidate fault record that is present in the respective maintenance record.

In some embodiments, identifying the one or more candidate fault records of the plurality of fault records for correlation with the respective maintenance record based on the time window comprises determining that timestamps associated with the one or more candidate fault records fall within the time window, wherein the time window is based on a timestamp associated with the respective maintenance record.

In certain embodiments, the parameters of each respective fault code comprise one or more first parameters of a first parameter type and one or more second parameters of a second parameter type.

Other embodiments provide a system comprising a processor and a non-transitory computer-readable medium comprising instructions that, when executed by the processor, cause the processor to perform the method described above.

Other embodiments provide a non-transitory computer-readable medium comprising instructions that, when executed by the processor, cause the processor to perform the method described above.

BRIEF DESCRIPTION OF THE DRAWINGS

The appended figures depict certain aspects of the one or more embodiments and are therefore not to be considered limiting of the scope of this disclosure.

FIG. 4 illustrates an example of maintenance records.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
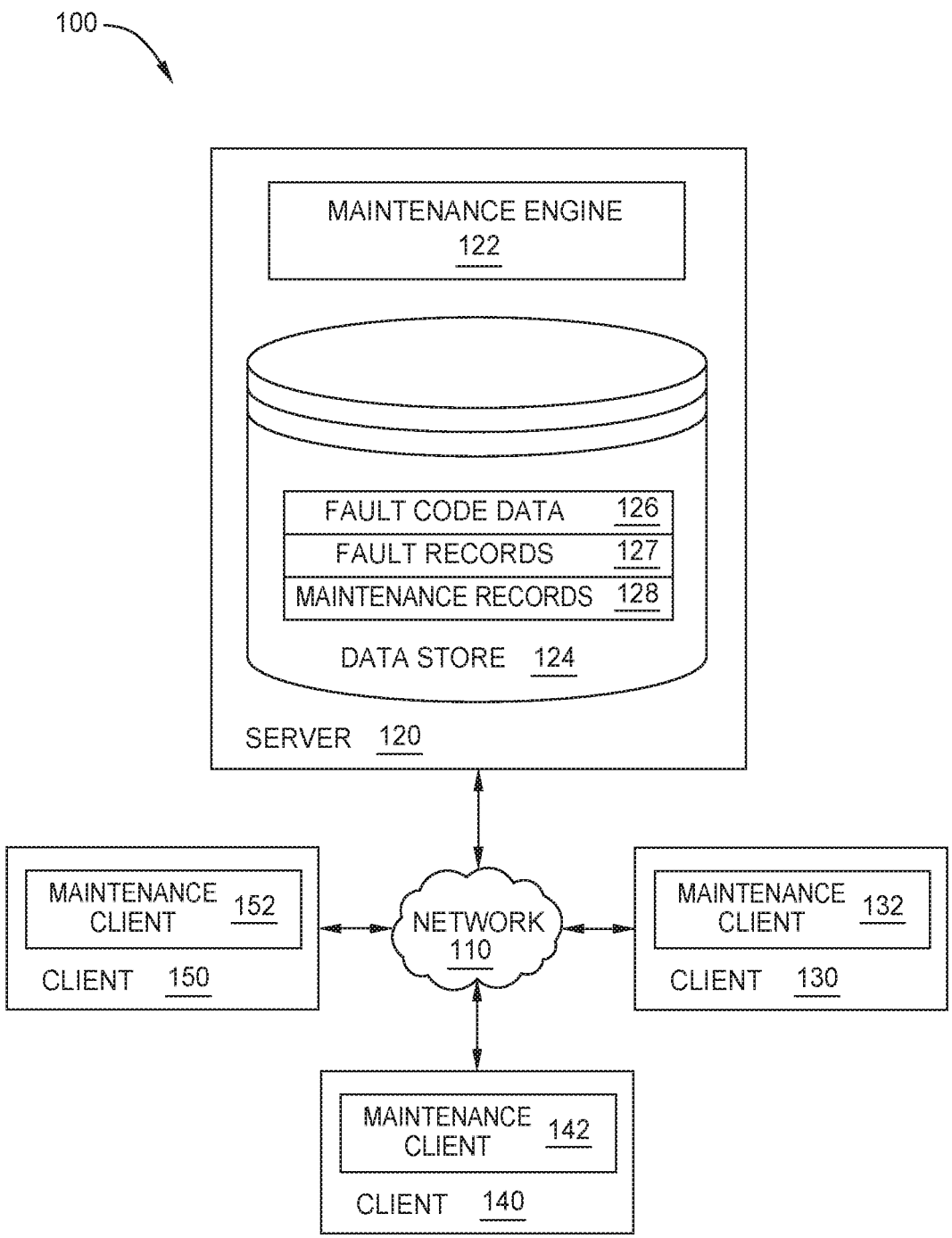
FIG. 1 depicts an example computing environment in which embodiments of the present disclosure may be implemented.

Aspects of the present disclosure provide techniques for providing maintenance recommendations in response to faults.

Certain vehicles include monitoring technologies that detect and report abnormal conditions as fault messages. In some cases, maintenance actions performed on vehicles in response to faults are recorded in maintenance records. However, matching maintenance records to faults can be challenging without manual review. For example, some existing techniques involve searching for specific identifiers of faults, such as codes, part names, and system names, within maintenance records. These techniques may miss connections between faults and maintenance records, however, because not all maintenance records clearly identify faults, parts, or systems to which they correspond. Furthermore, certain codes, part names, and system names are not unique to a particular fault. As such, existing techniques sometime involve manual entry of query terms to identify language that is unique to a given fault within maintenance records. Manual intervention is inefficient and time-consuming, and often requires the involvement of a subject matter expert (SME) to determine appropriate query terms. Furthermore, manual determination of query terms is subjective and inconsistent, and may have mixed results.

Aircrafts, for example, often include systems to monitor components of the aircraft during flight and report fault messages when abnormal conditions are identified. Fault messages may be reported to an operator of the aircraft and/or to another system or individual to ensure appropriate maintenance is pursued to address the abnormal conditions underlying the fault messages. Additionally, during maintenance of a vehicle, reports are often generated, which indicate action codes and/or text descriptions of the repair and/or other maintenance procedure performed by the maintenance personnel on the vehicle.

In some cases, maintenance systems analyze maintenance records and faults to identify maintenance actions that successfully resolved a fault on a given fleet of vehicles. The value of this capability is that it provides actionable information to a user whenever a new fault occurs. When a new fault occurs on a vehicle, the maintenance system displays the maintenance records that have historically resolved the problem.

In certain examples, a maintenance system for vehicles communicates with monitoring components of the vehicles that detect abnormal conditions and report the abnormal conditions as fault messages associated with one or more components of the vehicles. The maintenance system may store the fault messages as fault records, such as at a central server. Furthermore, when maintenance actions are performed on the vehicle, maintenance records are entered by maintenance professionals and stored by the maintenance system, such as at the central server. As such, techniques described herein relate to correlating stored maintenance records with stored fault records so that, when a fault occurs, the maintenance system can recommend maintenance actions for the fault based on the correlations.

Correlating maintenance records with fault records can be a difficult process, and conventional techniques often involve manual intervention. Example embodiments described herein, however, allow for automated correlation of maintenance records with fault records by identifying unique parameters of faults. In some embodiments, data related to faults is received, such as from a fault isolation manual (FIM) created by one or more vehicle manufacturers. The data, which may be referred to as fault code data, may include various parameters related to a plurality of fault codes, as described in more detail below with respect to FIG. 3. In some embodiments, frequencies of terms within parameters of a given fault code are analyzed to determine how often a term appears in attributes of the given fault code as compared to attributes of all fault codes. As such, the maintenance system determines which parameters and/or terms are unique to a given fault code, which indicates that those parameters and/or terms can be used to effectively search for maintenance records that relate to the given fault code. In some examples, a uniqueness score is determined for each parameter of a given fault code.

In certain embodiments, once unique parameters are identified for fault codes, maintenance records are correlated with fault records based on the unique parameters.

In an example, candidate fault records for a given maintenance records are identified by determining which fault records fall within a time window with respect to the given maintenance record. In one example, all fault records that fall within a time window of two days before and one day after the maintenance record are considered candidate fault records.

Then a correlation score is determined for each candidate fault record with respect to the given maintenance record.

In certain embodiments, a correlation score for a given candidate fault record with respect to the given maintenance record is determined based on how many unique parameters of the fault code corresponding to the given fault record are present in the given maintenance record. In some embodiments, the correlation score is weighted based on uniqueness scores of the unique parameters present in the given maintenance record.

Correlation scores are then used to correlate fault records with maintenance records. As such, when a fault is encountered (e.g., when a fault is detected by the monitoring component of the vehicle and a fault message is provided to the maintenance system containing a fault code of the fault that was detected), one or more maintenance actions may be recommended for addressing the fault based on the correlations between fault records and maintenance records. In certain examples, all maintenance records that correlate to a fault record corresponding to the fault (e.g., a fault record that has the same fault code as the fault) with a correlation score above a threshold are provided as recommended maintenance actions.

Example Computing Environment for Automated Maintenance Recommendations

FIG. 1 depicts an example computing environment 100 in which embodiments of the present disclosure may be implemented. Computing environment 100 includes a server 120 and clients 130, 140, and 150, connected via network 110. Network 110 may represent, for example, a wide area network (WAN), local area network (LAN), wireless LAN (WLAN), personal area network (PAN), a cellular network, the Internet, or any connection over which data may be transmitted.

Server 120 is generally representative of a computing device, such as a server computer or desktop computer. Server 120 include maintenance engine 122, which performs certain operations described herein related to maintenance recommendations in response to faults. In certain embodiments, maintenance engine 122 communicates via network 110 with maintenance clients 132, 142, and 152 of clients 130, 140, and 150, respectively, in order to request and/or receive fault records 127, maintenance records 128, and faults (e.g., as they occur in real-time or near real-time) and provide maintenance recommendations. In certain embodiments, maintenance engine 122 retrieves fault code data 126 from another local or remote source, such as from a fault isolation manual (FIM). A FIM is a manual that contains information necessary for a trained mechanic to perform servicing for particular fault codes of a vehicle. In certain embodiments, maintenance engine 122 automatically extracts fault code data 126 from one or more FIMs, such as based on keywords and/or structure in the FIMs, while in other embodiments a user enters fault code data 126 based on the FIMs.

Server 120 also includes data store 124, which is generally representative of a data storage entity such as a database or repository, and which may alternatively be implemented as a separate and/or network-accessible storage component. Data store 124 contains fault code data 126, which is generally representative of data relating to fault codes, such as parameters of fault codes retrieved from a FIM. Parameters of a fault code include a number of parameter types such as, for example, parts (e.g., names of parts that may relate to the fault code), flight deck effects (FDEs), which generally refer to indications of systems of a vehicle that relate to faults, message text (e.g., that is displayed on a client system with the fault occurs), and message numbers (e.g., a unique number associated with the message that is displayed on the client device when the fault occurs), as described in more detail below with respect to FIG. 3.

Data store 124 further includes fault records 127, which generally represent records of faults that were detected on various vehicles, and may include fault codes and timestamps indicating the date and/or time at which the faults occurred, as described in more detail below with respect to FIG. 5. In some examples, maintenance clients 132, 142, and 152 provide fault records 127 to maintenance engine 122 at regular intervals, and maintenance engine 122 stores fault records 127 in data store 124.

Data store 124 further includes maintenance records 128, which generally represent records of maintenance actions that were performed on various vehicles, and may include timestamps indicating the date and/or time at which the maintenance actions were performed, defect text describing the defect that was observed, and maintenance action text indicating the maintenance that was performed, as described in more detail below with respect to FIG. 4. In some examples, maintenance clients 132, 142, and 152 provide maintenance records 128 to maintenance engine 122 at regular intervals, and maintenance engine 122 stores maintenance records 128 in data store 124.

Maintenance engine 122 analyzes fault code data 126 to determine unique parameters of fault codes, and uses the unique parameters to identify correlations between fault records 127 and maintenance records 128, as described in more detail below with respect to FIG. 2. As such, when maintenance engine 122 receives a fault from one of maintenance clients 132, 142, and 152, maintenance engine 122 can respond with recommended maintenance actions for the fault based on the correlations, as described in more detail below with respect to FIG. 7.

Clients 130, 140, and 150 generally represent computing devices, such as computing systems integrated into or associated with vehicles such as aircrafts. Clients 130, 140, and 150 include maintenance clients 132, 142, and 152, which generally represent client-side components that correspond to maintenance engine 122. In certain embodiments, maintenance clients 132, 142, and 152 include user interface components that display fault messages and recommended maintenance actions to users, as described in more detail below with respect to FIG. 6. In certain examples, maintenance clients 132, 142, and 152 communicate with maintenance engine 122 to provide faults and receive recommended maintenance actions.

It is noted that clients 130, 140, and 150 are included to be representative of a plurality of client systems. In certain embodiments, maintenance engine 122 communicates with a large number of client systems associated with vehicles from a plurality of transportation providers, such as airlines.

Example Operations for Automated Maintenance Recommendations

Figure 2:
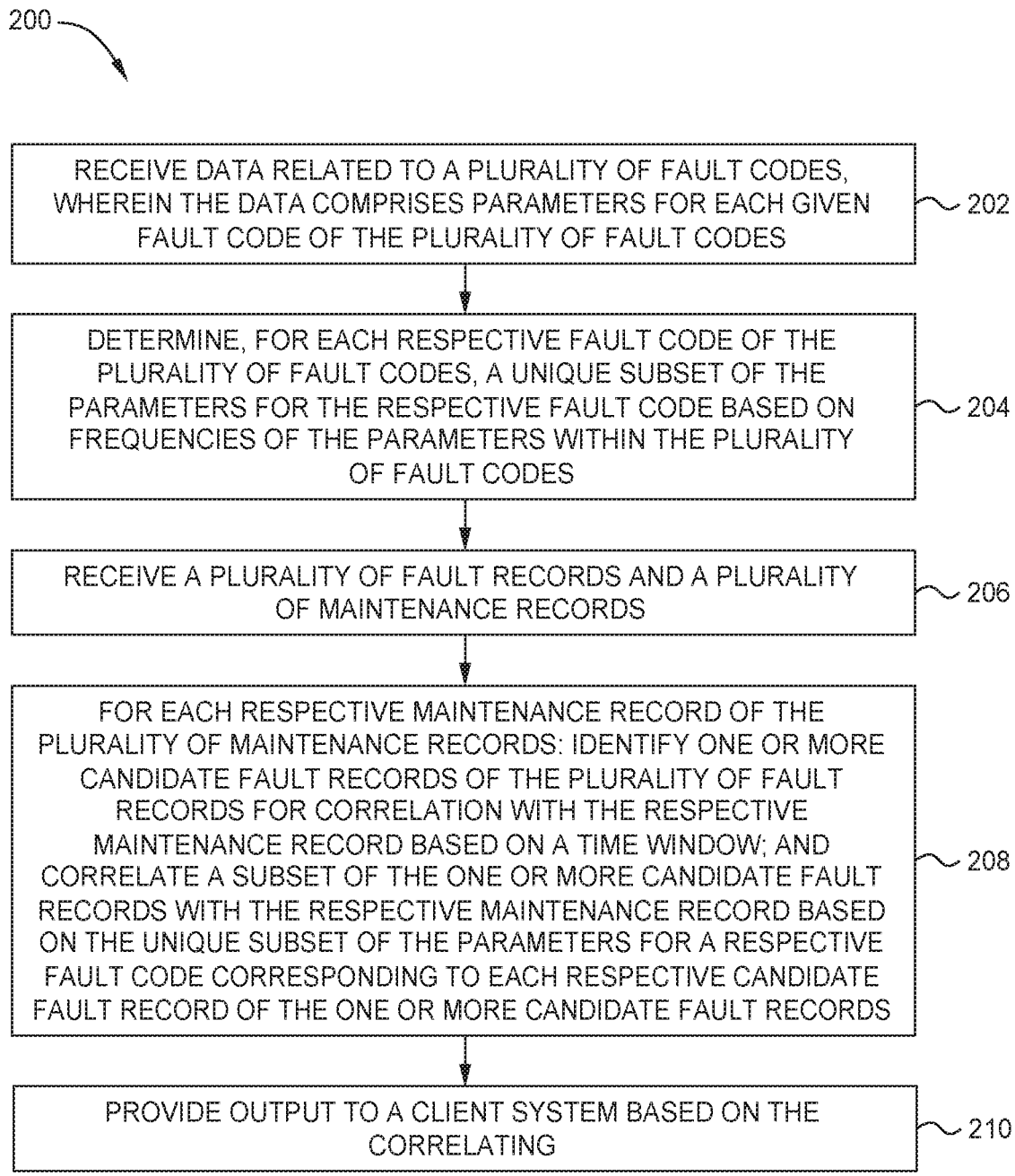
FIG. 2 illustrates example operations related to automated maintenance recommendations.

FIG. 2 illustrates example operations 200 related to automated maintenance recommendations. FIG. 2 is described in conjunction with FIGS. 3, 4, and 5, which illustrate fault code data, maintenance records, and fault records, respectively. In some implementations, operations 200 are performed by maintenance engine 122 of FIG. 1.

At 202, data related to a plurality of fault codes is retrieved, wherein the data comprises parameters for each given fault code of the plurality of fault codes.

Figure 3:
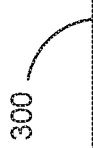
FIG. 3 illustrates an example of fault code data.

In one example, maintenance engine 122 of FIG. 1 retrieves fault code data 126 of FIG. 1, which is also represented by fault code data 300 of FIG. 3, from a FIM or from data store 124 of FIG. 1. Fault code data 300 generally represents data related to fault codes. Fault code data 300 includes fault codes associated with parameters of different parameter types, including FDEs, parts, message text, and message numbers. For example, in fault code data 300, fault code "555 103 51" is associated with the FDE "ENG EEC Cl L", a plurality of parts that could relate to the cause of the fault, including "OIL DEBRIS MONITORING SENSOR", "OIL DEBRIS MONITORING TRANSMITTER", and "ENGINE 1", message text that states "OIL DEBRIS MONITORING SYSTEM HAS DETECTED DEBRIS", and a message number "79-41192". In certain embodiments, each of the parameters in fault code data 300 was retrieved from a FIM.

At 204, for each respective fault code of the plurality of fault codes, a unique subset of the parameters for the respective fault code is determined based on frequencies of the parameters within the plurality of fault codes. In one example, maintenance engine 122 of FIG. 1 analyzes fault code data 300 of FIG. 3 to identify a unique subset of the parameters for each fault code. With respect to fault code data 300, the parameters of a given fault code, such as "555 103 51", include all parameters of each parameter type, including all FDEs, all parts, the message text, and the message number.

In an example, maintenance engine 122 of FIG. 1 determines a unique subset of the parameters of fault code "555 103 51" of fault code data 300 of FIG. 3 by determining how frequently each parameter of the fault code appears in all fault codes. In fault code data 300, the FDE "ENG EEC Cl L" appears in the parameters of all three fault codes that are shown.

In certain embodiments, if a parameter of a given fault code appears in less than a threshold percentage or amount of fault codes, then the parameter is considered a unique parameter for inclusion in the unique subset. In one example the FDE "ENG EEC Cl L" appears in many fault codes and is therefore not considered a unique parameter for fault code "555 103 51". On the other hand, if the part "OIL DEBRIS MONITORING TRANSMITTER UNIT" only appears in a single fault code or a small number of fault codes that is statically below a calculated threshold, then it is considered a unique parameter of fault code "555 103 51". In this example, the unique subset of parameters for fault code "555 103 51" includes the parts "OIL DEBRIS MONITORING SENSOR" and "OIL DEBRIS MONITORING TRANSMITTER UNIT" and the message number "79-41192". Selecting a unique subset of parameters allows parameters that are not unique to a given fault code, e.g. "ENG EEC Cl L", to be excluded from the process of correlating fault records with maintenance records, as these non-unique parameters are not likely to be helpful in the correlation process.

In some embodiments, preprocessing is performed on each unique parameter in the set. Preprocessing includes, for example, synonym resolution, association resolution such as resolving acronyms to their full text, text normalization, removal of stop words such as "the". In an example, preprocessing of the parameter "OIL DEBRIS MONITORING SYSTEM HAS DETECTED DEBRIS" includes removing the word "HAS" as a stop word, resolving "DEBRIS" to a set of synonyms including "DEBRIS, PARTICLE, PARTICLES, and CONTAMINATION". In certain instances, preprocessing is based on dictionaries that define domain-specific synonyms, stop words, and acronyms. In one example, a dictionary specific to aircraft maintenance defines the acronym ODMS as "OIL DEBRIS MONITORING SYSTEM".

In certain embodiments, maintenance engine 122 of FIG. 1 determines, for each respective fault code of the plurality of fault codes, a uniqueness score for each given term within each unique parameter of the unique subset of the parameters for the respective fault code. In some embodiments, uniqueness scores are determined after preprocessing. In one example, the uniqueness score of a given term is calculated by determining a ratio of the frequency of the given term within the unique subset of the parameters for the respective fault code over the frequency of the given term within the unique subset of the parameters for each fault code of the plurality of fault codes. For a given unique parameter, the uniqueness scores of each term within the given unique parameter are normalized so that the sum of the uniqueness scores of all terms within the given unique parameter add up to one.

In one example, uniqueness scores are determined for each term of the part "OIL DEBRIS MONITORING TRANSMITTER UNIT" of fault code "555 103 51". The term "OIL" appears three times in parameters of fault code "555 103 51" and appears four times in parameters of all fault codes, so the uniqueness score, before normalization, for the term "OIL" is 3/4. The term "DEBRIS" appears four times in parameters of fault code "555 103 51" and appears five times in parameters of all fault codes, so the uniqueness score, before normalization, for the term "DEBRIS" is 4/5. The term "MONITORING" appears three times in parameters of fault code "555 103 51" and appears five times in parameters of all fault codes, so the uniqueness score, before normalization, for the term "MONITORING" is 3/5. The term "TRANSMITTER" appears one time in parameters of fault code "555 103 51" and appears one times in parameters of all fault codes, so the uniqueness score, before normalization, for the term "TRANSMITTER" is 1/1. The term "UNIT" appears one time in parameters of fault code "555 103 51" and appears two times in parameters of all fault codes, so the uniqueness score, before normalization, for the term "UNIT" is 1/2.

The uniqueness scores for all of the terms are then normalized, such as by applying a normalization function, so that they all add up to one. After normalization, the uniqueness score of "OIL" is approximately 0.205, the uniqueness score of "DEBRIS" is approximately 0.286, the uniqueness score of "MONITORING" is approximately 0.164, the uniqueness score of "TRANSMITTER" is approximately 0.274, and the uniqueness score of "UNIT" is approximately 0.137. While not included in this example, uniqueness scores may also factor in the data added or removed during preprocessing. In an example, synonyms of each term are also considered to be instances of the term when calculating frequencies.

At 206, a plurality of fault records and a plurality of maintenance records are received. In certain examples, maintenance engine 122 of FIG. 1 receives the plurality of fault records and the plurality of maintenance records separately at regular intervals, such as from maintenance clients 132, 142, and/or 152 of FIG. 1.

In certain embodiments, the plurality of maintenance records is represented by maintenance records 400 of FIG. 4. Maintenance records 400 include multiple records that each include a timestamp indicating the date and/or time at which the record was created, defect text that indicates the defect that was observed, and maintenance action text that indicates the maintenance that was performed. For example, in maintenance records 400, the date "7 Aug. 2018" is associated with the defect text "ONE LEFT NAV LIGHT INOP POSITION LIGHT LED MODULES ALL OPERATIONS" and the maintenance action text "CLEARING DMA LOG PAGE #0518559 PERFORMED OPS CHECK PER AMM-33-43-11. OPS CHECK NORMAL. CL #50877".

Figure 5:
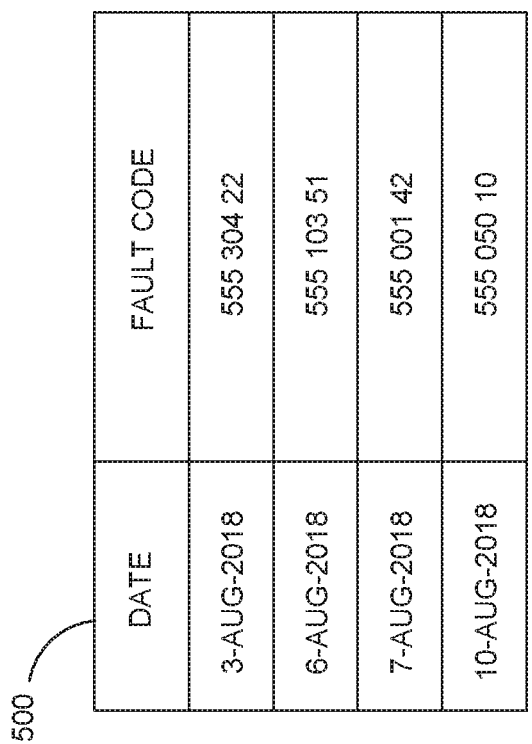
FIG. 5 illustrates an example of fault records.

In certain embodiments, the plurality of fault records is represented by fault records 500 of FIG. 5. Fault records 500 include multiple records that each include a timestamp indicating the date and/or time at which a given fault was detected and a fault code corresponding to the given fault. For example, in fault records 500, the date "3 Aug. 2018" is associated with the fault code "555 304 22".

At 208, for each respective maintenance record of the plurality of maintenance records, one or more candidate fault records of the plurality of fault record is identified for correlation with the respective maintenance record based on a time window. Furthermore, for each respective maintenance record of the plurality of maintenance records, a subset of the one or more candidate fault records is correlated with the respective maintenance record based on the unique subset of the parameters for a respective fault code corresponding to each respective candidate fault record of the one or more candidate fault records.

In an example, maintenance engine 122 of FIG. 1 determines which of the plurality of fault records fall within a time window with respect to the respective maintenance record. In certain examples, the time window for candidate fault records for correlation with a given maintenance record is two days before and one day after the given maintenance record. The reason the time window may allow fault records dated later than respective maintenance records to be correlation candidates is to account for potential time zone differences and/or delays in processing of records. In one example, the respective maintenance record is the record dated "7-Aug.-2018" in maintenance records 400 of FIG. 4. Given the time window of two days before and one day after 7 Aug. 2018, two of fault records 500 of FIG. 5 fall within the time window: fault code "555 103 51" dated "6 Aug. 2018" and fault code "555 001 41" dated "7 Aug. 2018". As such, these two fault records are considered candidate fault records.

Maintenance engine 122 of FIG. 1 then determines which of the candidate fault records to correlate with the given maintenance record. In certain embodiments, maintenance engine 122 of FIG. 1 compares the unique parameters for the fault code corresponding to each candidate fault record to the given maintenance record. In one example, maintenance engine 122 of FIG. 1 determines a correlation score for each candidate fault record based on how many terms from each unique parameter of the candidate fault record are present in the given maintenance record. In certain embodiments, the correlation score is based on the uniqueness scores of each term. In an example, the uniqueness scores of all terms from a given candidate fault record's parameters that are present in the given maintenance record are added together to determine the correlation score for the given candidate fault record with respect to the given maintenance record.

In certain embodiments, all candidate fault records that have a correlation score above a certain threshold are correlated with the given maintenance record. In an example, maintenance engine 122 of FIG. 1 stores correlations between maintenance records and fault records or fault codes so that maintenance records can be recommended in response to faults.

At 210, output is provided to a client system based on the correlating. In certain embodiments, maintenance engine 122 of FIG. 1 receives a particular fault record from maintenance client 132 of FIG. 1, such as after a fault was detected on a vehicle associated with client 130 of FIG. 1. In an example, a user accesses maintenance client 132 of FIG. 1 to receive maintenance recommendations for the fault, including particular maintenance actions from maintenance records that are correlated with the fault code of the fault. In certain embodiments, maintenance engine 122 of FIG. 1 determines, based on the stored correlations determined at 208, that one or more particular maintenance records are correlated to the particular fault record, and provides the one or more particular maintenance records to maintenance client 132 of FIG. 1. In some embodiments, maintenance client 132 of FIG. 1 displays the one or more particular maintenance records to the user as maintenance recommendations via a user interface, as described in more detail below with respect to FIG. 6. As such, the user is enabled to see what maintenance actions have historically been performed in response to the particular fault.

Example User Interface for Maintenance Recommendations

Figure 6:
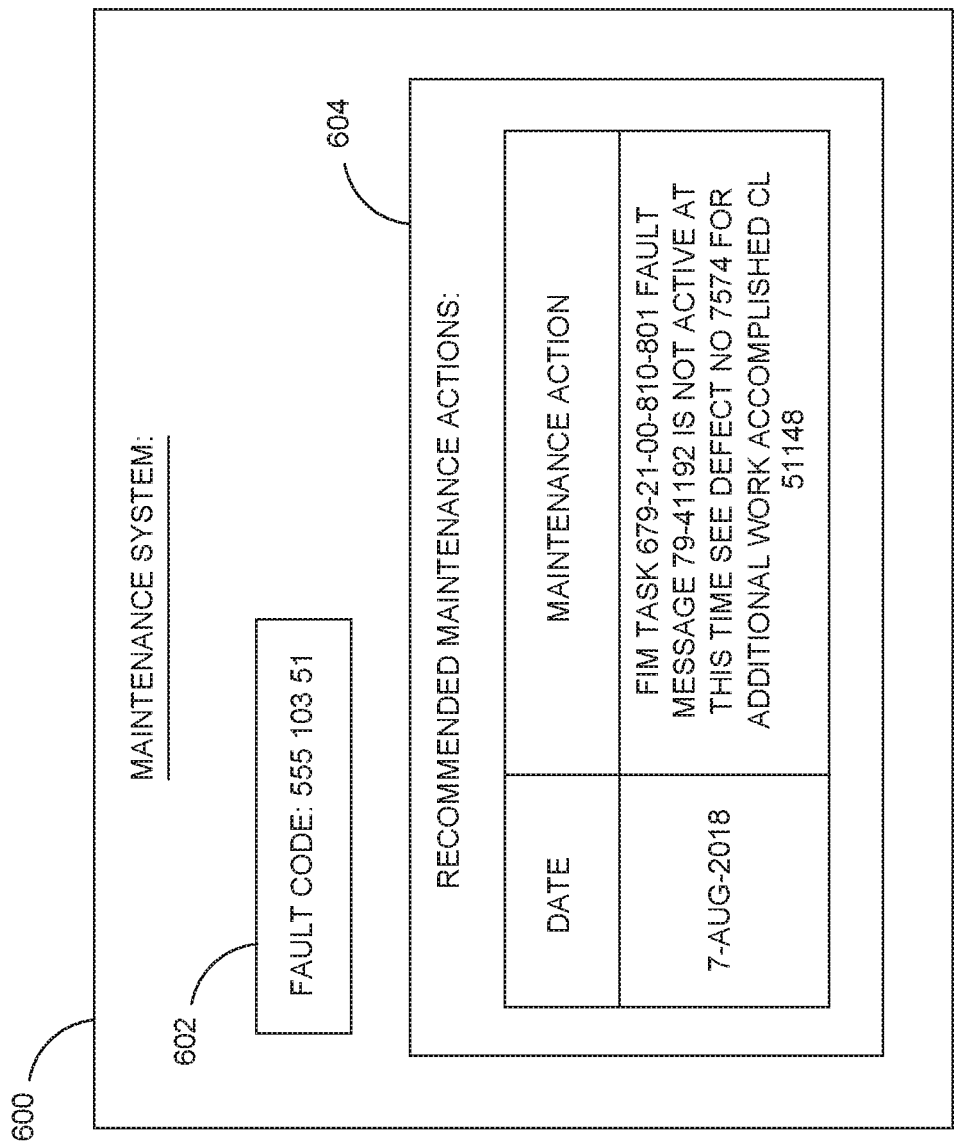
FIG. 6 illustrates an example user interface for providing automated maintenance recommendations.

FIG. 6 illustrates an example user interface 600 for maintenance recommendations. In an example, user interface 600 is associated with maintenance client 132 of FIG. 1. As described below with respect to FIG. 7, user interface 600 may be displayed within a vehicle, such as an aircraft.

User interface 600 includes component 602, which indicates that a fault has been detected, such as in one or more systems of a vehicle. Component 602 displays a fault code of the fault, "555 103 51". In some embodiments, maintenance client 132 of FIG. 1 sends the fault code to maintenance engine 122 of FIG. 1 and receives one or more maintenance recommendations in response.

User interface 600 further includes component 604, which includes maintenance recommendations related to the fault code displayed in component 602. In user interface 600, component 604 includes the maintenance action "FIM TASK 679-21-00-810-801 FAULT MESSAGE 79-41192 IS NOT ACTIVE AT THIS TIME SEE DEFECT NO 7574 FOR ADDITIONAL WORK ACCOMPLISHED CL 51148," which was performed on "7 Aug. 2018" and is correlated with the fault code "555 103 51," as determined by maintenance engine 122 of FIG. 1. As such, a user of user interface 600 is enabled to see that this particular maintenance action was historically performed in response to this particular fault, which may guide the user in determining how to address the particular fault in the present case.

Example Embodiment of Maintenance Recommendations

Figure 7:
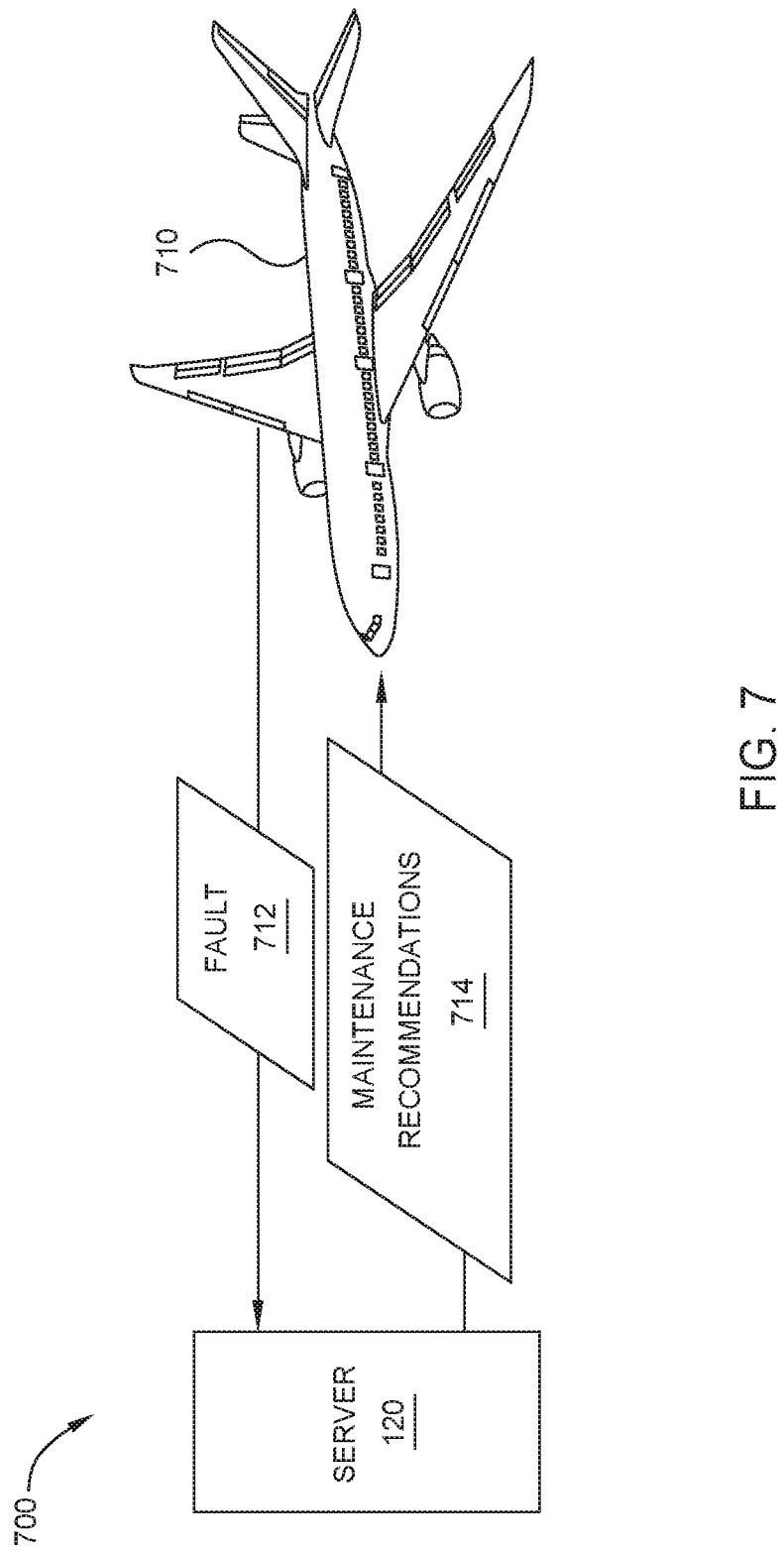
FIG. 7 illustrates an example embodiment of maintenance recommendations.

FIG. 7 illustrates an example embodiment 700 of maintenance recommendations. Embodiment 120 includes server 120 in FIG. 1.

Embodiment 700 further includes aircraft 710, which is generally representative of an aerial vehicle. While embodiment 700 includes aircraft 710, it is noted that techniques described herein may be implemented in other contexts, such as with other types of vehicles or systems (e.g., automobiles, trains, boats, etc.). In certain embodiments client 130 of FIG. 1 may be included within aircraft 710.

In embodiment 700, a fault 712 is sent from aircraft 710 to server 120. In an example, fault 712 is detected within aircraft 710, and maintenance client 132 of FIG. 1 sends fault 712 to server 120, such as in the form of a fault record, which identifies a fault code.

Server 120 sends maintenance recommendations 714 to aircraft 710 in response to fault 712, such as while aircraft 710 is being worked on by a maintenance professional. In an example, server 120 determines that one or more maintenance records are correlated with the fault code of fault 712, such as based on the correlation techniques described above with respect to FIG. 2. As such, server 120 sends the one or more maintenance records to aircraft 710 as maintenance recommendations 714. In certain embodiments, maintenance recommendations 714 are displayed to a user within an aircraft maintenance device, such as a laptop computer, desktop computer, mobile computing device such as a tablet computer, or other computing device associated with aircraft 710, such as via user interface 600 of FIG. 6. In certain examples, the user is a maintenance professional working on aircraft 710

Example Processing System for Maintenance Recommendations

Figure 8:
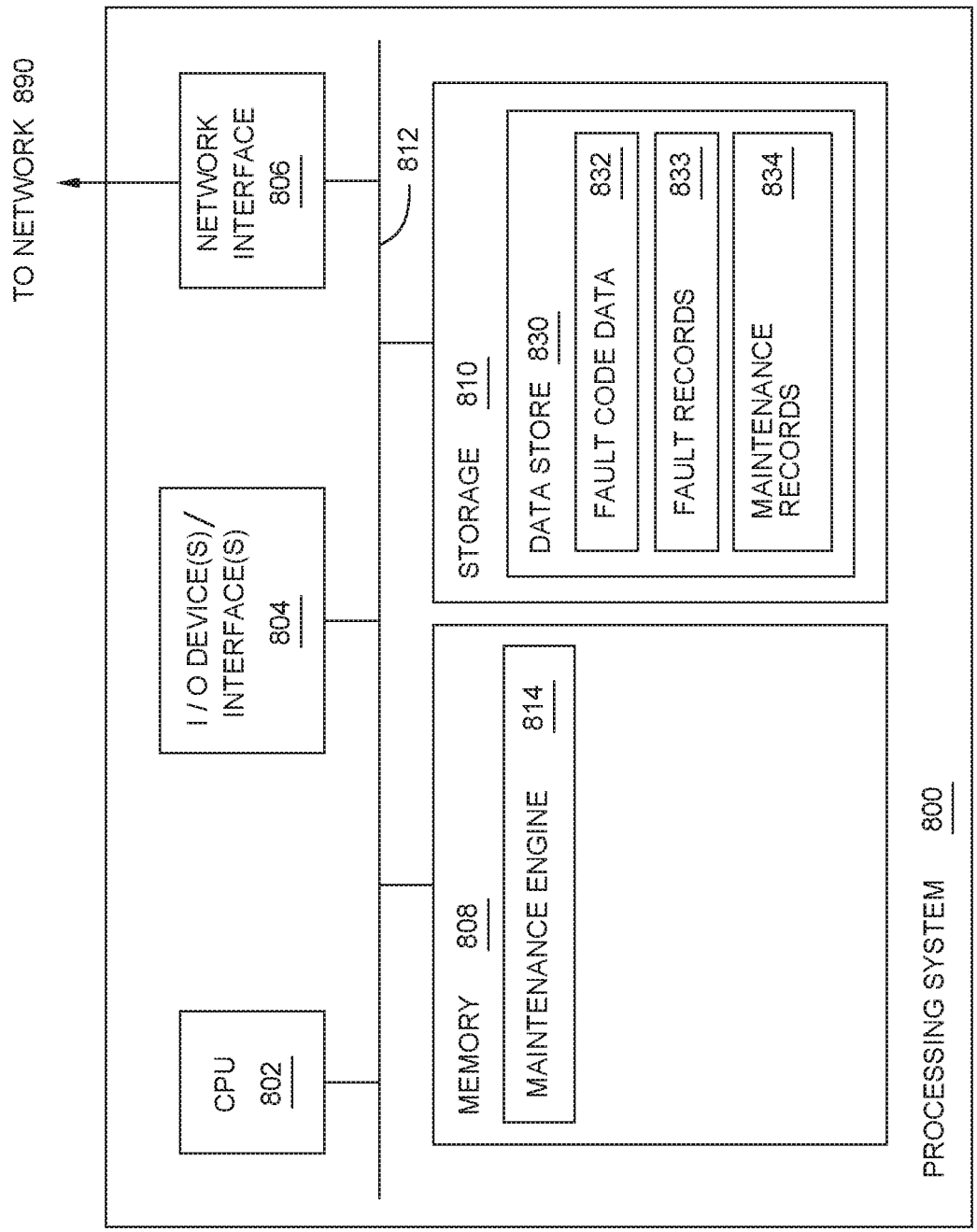
FIG. 8 illustrates an example processing system with which embodiments of the present disclosure may be implemented.

FIG. 8 depicts a processing system 800 that may be used to perform methods described herein, such as the operations 200 for maintenance recommendations described above with respect to FIG. 2. In certain embodiments, processing system 800 is representative of server 120 of FIG. 1. In other embodiments, certain components of processing system 800 are representative of clients 130, 140, and/or 150. For example, all components of processing system 800 other than the contents of memory 808 and storage 810 may be representative of components of clients 130, 140, and/or 150.

Processing system 800 includes a CPU 802 connected to a data bus 812. CPU 802 is configured to process computer-executable instructions, e.g., stored in memory 808 or storage 810, and to cause processing system 800 to perform methods as described herein, for example with respect to FIG. 2. Though depicted as only including only one CPU 802, processing system 800 may have more than one processor.

Processing system 800 further includes input/output device(s) and interface(s) 804, which allows processing system 800 to interface with input/output devices, such as, for example, keyboards, displays, mouse devices, pen input, and other devices that allow for interaction with processing system 800. Note that while not depicted with independent external I/O devices, processing system 800 may connect with external I/O devices through physical and wireless connections (e.g., an external display device).

Processing system 800 further includes network interface 806, which provides processing system 800 with access to external networks, such as network 890, and thereby external computing devices.

Processing system 800 further includes memory 808, which in this example includes maintenance engine 814, which may perform operations described above with respect FIG. 2. In one example, maintenance engine 814 determines unique parameters of fault records included in fault code data 832, and uses these unique parameters to determine correlations between fault records 833 and maintenance records 834, as described above with respect to FIGS. 1-5. Furthermore, maintenance engine 814 may receive a fault record via network interface 806 and determine one or more maintenance recommendations to provide in response to the fault record based on the correlations.

Note that while shown as a single memory 808 in FIG. 8 for simplicity, the aspects stored in memory 808 may be stored in different physical memories, but all accessible to CPU 802 via data connections, such as bus 812.

Processing system 800 further includes storage 810, which in this example includes data store 830, which generally represents data store 124 of FIG. 1. Data store 830 includes fault code data 832, fault records 833, and maintenance records 834, which generally represent fault code data 126, fault records 127, and maintenance records 128 of FIG. 1.

While not depicted in FIG. 8, other aspects may be included in storage 810.

As with memory 808, a single storage 810 is depicted in FIG. 8 for simplicity, but the various aspects stored in storage 810 may be stored in different physical storages, but all accessible to CPU 802 via internal data connections, such as bus 812, I/O interfaces 805, or external connection, such as network interface 806.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
receiving data related to a plurality of fault codes, wherein the data comprises parameters for each given fault code of the plurality of fault codes;
determining, for each respective fault code of the plurality of fault codes, a unique subset of the parameters for the respective fault code based on frequencies of the parameters within the plurality of fault codes;
receiving a plurality of fault records;
receiving a plurality of maintenance records;
for each respective maintenance record of the plurality of maintenance records:
identifying one or more candidate fault records of the plurality of fault records for correlation with the respective maintenance record based on a time window; and
correlating a subset of the one or more candidate fault records with the respective maintenance record based on the unique subset of the parameters for the respective fault code corresponding to each respective candidate fault record of the one or more candidate fault records; and
providing output to a client system based on the correlating.

2. The computer-implemented method of claim 1, wherein providing the output to the client system based on the correlating comprises:
receiving a particular fault record from the client system;
determining, based on the correlating, that the particular fault record is correlated with a particular maintenance record of the plurality of maintenance records; and
providing the particular maintenance record to the client system.

3. The computer-implemented method of claim 1, wherein determining, for each respective fault code of the plurality of fault codes, the unique subset of the parameters for the respective fault code comprises determining a uniqueness score for each respective term within each respective parameter of the unique subset of the parameters for the respective fault code.

4. The computer-implemented method of claim 3, wherein determining the uniqueness score for each respective term within each respective parameter of the unique subset of the parameters for the respective fault code comprises determining a frequency of the respective term within the parameters for the respective fault code and a frequency of the respective term within the parameters for each fault code of the plurality of fault codes.

5. The computer-implemented method of claim 4, wherein correlating the subset of the one or more candidate fault records with the respective maintenance record comprises determining, for each respective candidate fault record of the one or more candidate fault records, a correlation score in relation to the respective maintenance record based on the uniqueness score for each given parameter of the unique subset of the parameters of the given fault code corresponding to the respective candidate fault record that is present in the respective maintenance record.

6. The computer-implemented method of claim 1, wherein identifying the one or more candidate fault records of the plurality of fault records for correlation with the respective maintenance record based on the time window comprises determining that timestamps associated with the one or more candidate fault records fall within the time window, wherein the time window is based on a timestamp associated with the respective maintenance record.

7. The computer-implemented method of claim 1, wherein the parameters of each respective fault code comprise one or more first parameters of a first parameter type and one or more second parameters of a second parameter type.

8. A system, comprising a processor and a non-transitory computer-readable medium comprising instructions that, when executed by the processor, cause the processor to perform a method, the method comprising:
receiving data related to a plurality of fault codes, wherein the data comprises parameters for each given fault code of the plurality of fault codes;
determining, for each respective fault code of the plurality of fault codes, a unique subset of the parameters for the respective fault code based on frequencies of the parameters within the plurality of fault codes;
receiving a plurality of fault records;
receiving a plurality of maintenance records;
for each respective maintenance record of the plurality of maintenance records:
identifying one or more candidate fault records of the plurality of fault records for correlation with the respective maintenance record based on a time window; and
correlating a subset of the one or more candidate fault records with the respective maintenance record based on the unique subset of the parameters for the respective fault code corresponding to each respective candidate fault record of the one or more candidate fault records; and
providing output to a client system based on the correlating.

9. The system of claim 8, wherein providing the output to the client system based on the correlating comprises:
receiving a particular fault record from the client system;
determining, based on the correlating, that the particular fault record is correlated with a particular maintenance record of the plurality of maintenance records; and
providing the particular maintenance record to the client system.

10. The system of claim 8, wherein determining, for each respective fault code of the plurality of fault codes, the unique subset of the parameters for the respective fault code comprises determining a uniqueness score for each respective term within each respective parameter of the unique subset of the parameters for the respective fault code.

11. The system of claim 10, wherein determining the uniqueness score for each respective term within each respective parameter of the unique subset of the parameters for the respective fault code comprises determining a frequency of the respective term within the parameters for the respective fault code and a frequency of the respective term within the parameters for each fault code of the plurality of fault codes.

12. The system of claim 11, wherein correlating the subset of the one or more candidate fault records with the respective maintenance record comprises determining, for each respective candidate fault record of the one or more candidate fault records, a correlation score in relation to the respective maintenance record based on the uniqueness score for each given parameter of the unique subset of the parameters of the given fault code corresponding to the respective candidate fault record that is present in the respective maintenance record.

13. The system of claim 8, wherein identifying the one or more candidate fault records of the plurality of fault records for correlation with the respective maintenance record based on the time window comprises determining that timestamps associated with the one or more candidate fault records fall within the time window, wherein the time window is based on a timestamp associated with the respective maintenance record.

14. The system of claim 8, wherein the parameters of each respective fault code comprise one or more first parameters of a first parameter type and one or more second parameters of a second parameter type.

15. A non-transitory computer-readable medium comprising instructions that, when executed by a processor, cause the processor to perform a method, the method comprising:
receiving data related to a plurality of fault codes, wherein the data comprises parameters for each given fault code of the plurality of fault codes;
determining, for each respective fault code of the plurality of fault codes, a unique subset of the parameters for the respective fault code based on frequencies of the parameters within the plurality of fault codes;
receiving a plurality of fault records;
receiving a plurality of maintenance records;
for each respective maintenance record of the plurality of maintenance records:
identifying one or more candidate fault records of the plurality of fault records for correlation with the respective maintenance record based on a time window; and
correlating a subset of the one or more candidate fault records with the respective maintenance record based on the unique subset of the parameters for the respective fault code corresponding to each respective candidate fault record of the one or more candidate fault records; and
providing output to a client system based on the correlating.

16. The non-transitory computer-readable medium of claim 15, wherein providing the output to the client system based on the correlating comprises:
receiving a particular fault record from the client system;
determining, based on the correlating, that the particular fault record is correlated with a particular maintenance record of the plurality of maintenance records; and
providing the particular maintenance record to the client system.

17. The non-transitory computer-readable medium of claim 15, wherein determining, for each respective fault code of the plurality of fault codes, the unique subset of the parameters for the respective fault code comprises determining a uniqueness score for each respective term within each respective parameter of the unique subset of the parameters for the respective fault code.

18. The non-transitory computer-readable medium of claim 17, wherein determining the uniqueness score for each respective term within each respective parameter of the unique subset of the parameters for the respective fault code comprises determining a frequency of the respective term within the parameters for the respective fault code and a frequency of the respective term within the parameters for each fault code of the plurality of fault codes.

19. The non-transitory computer-readable medium of claim 18, wherein correlating the subset of the one or more candidate fault records with the respective maintenance record comprises determining, for each respective candidate fault record of the one or more candidate fault records, a correlation score in relation to the respective maintenance record based on the uniqueness score for each given parameter of the unique subset of the parameters of the given fault code corresponding to the respective candidate fault record that is present in the respective maintenance record.

20. The non-transitory computer-readable medium of claim 15, wherein identifying the one or more candidate fault records of the plurality of fault records for correlation with the respective maintenance record based on the time window comprises determining that timestamps associated with the one or more candidate fault records fall within the time window, wherein the time window is based on a timestamp associated with the respective maintenance record.

* * * * *